Figure 1:
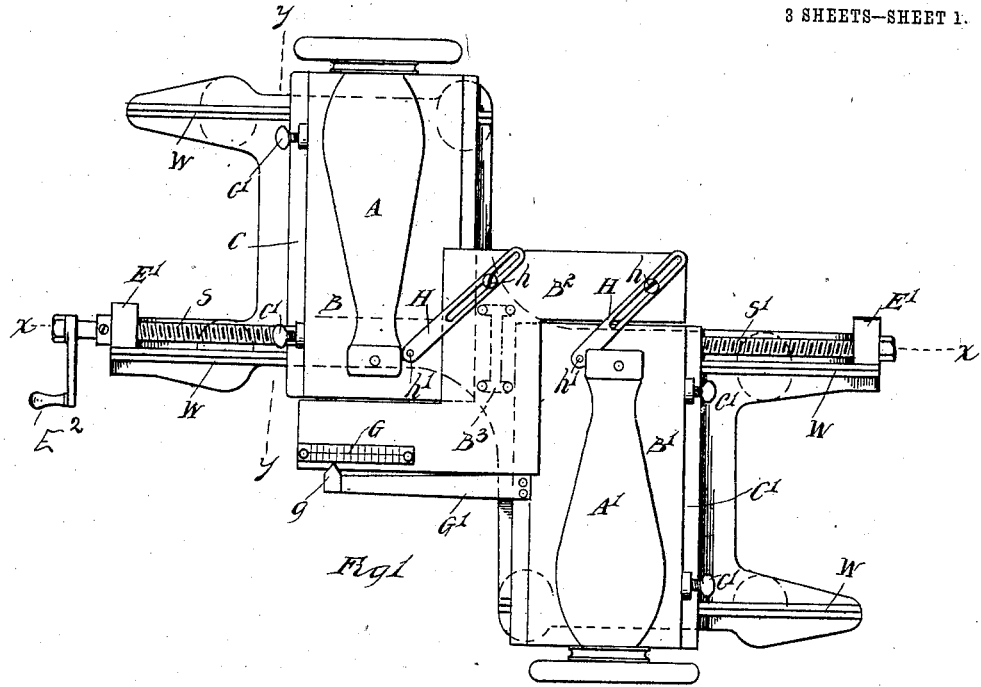

No. 832,922. PATENTED OCT. 9, 1906.
G. E. NORRIS.
COLLAR AND CUFF BUTTONHOLE MACHINE.
APPLICATION FILED JULY 13, 1903.

3 SHEETS—SHEET 1.

WITNESSES
Lotta Lee Hayton.

INVENTOR
George E. Norris
By Parker & Burton
Attorneys.

No. 832,922. PATENTED OCT. 9, 1906.
G. E. NORRIS.
COLLAR AND CUFF BUTTONHOLE MACHINE.
APPLICATION FILED JULY 13, 1903.
3 SHEETS—SHEET 2.
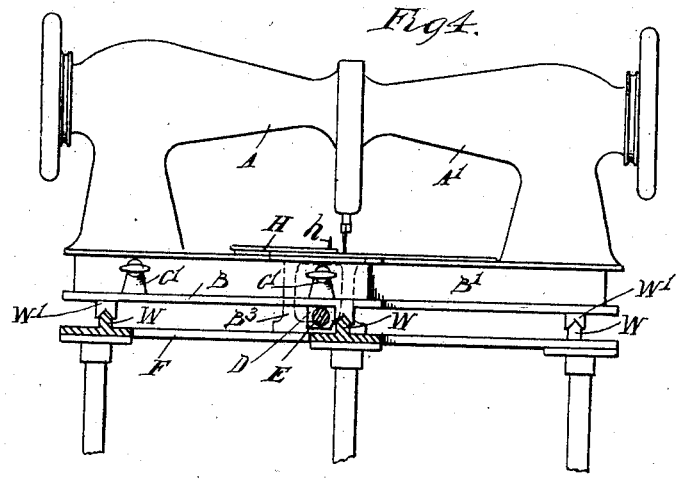
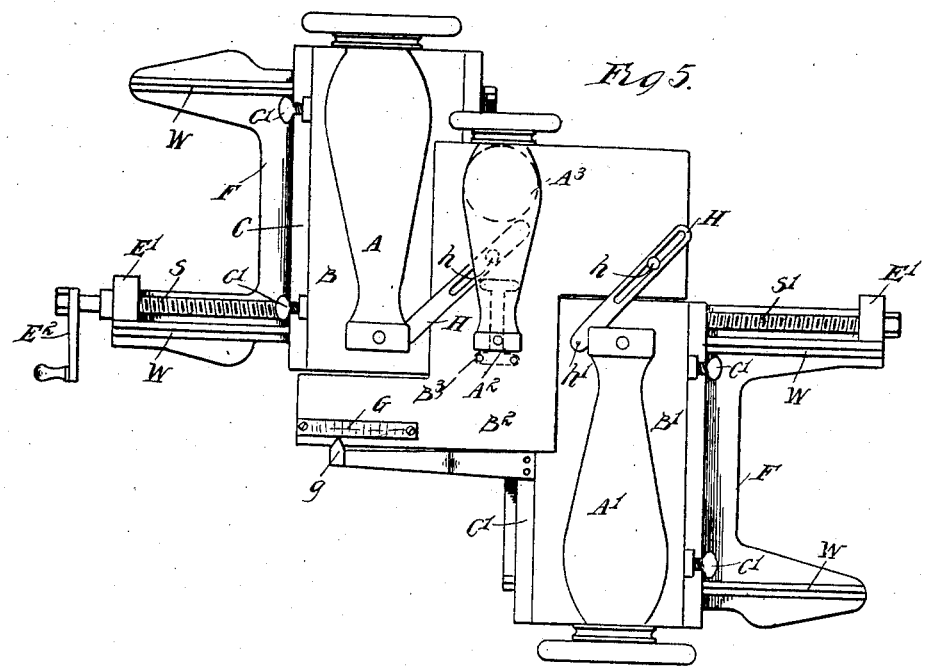
WITNESSES
Lotta Lee Hayton.
J. H. Massey
INVENTOR
George E. Norris
By Parker & Burton
Attorneys.

No. 832,922. PATENTED OCT. 9, 1906.
G. E. NORRIS.
COLLAR AND CUFF BUTTONHOLE MACHINE.
APPLICATION FILED JULY 13, 1903.

3 SHEETS—SHEET 3.

WITNESSES
Letta Lee Hayton
J. G. Massey

INVENTOR
George E. Norris
By Parker & Burton
Attorneys.

UNITED STATES PATENT OFFICE.

GEORGE E. NORRIS, OF DETROIT, MICHIGAN.

COLLAR AND CUFF BUTTONHOLE MACHINE.

No. 832,922.  Specification of Letters Patent.  Patented Oct. 9, 1906.

Application filed July 13, 1903. Serial No. 165,263.

*To all whom it may concern:*

Be it known that I, GEORGE E. NORRIS, a citizen of the United States, residing at Detroit, county of Wayne, State of Michigan, have invented a certain new and useful Improvement in Collar and Cuff Buttonhole-Stitching Machines; and I declare the following to be a full, clear, and exact description of the invention, such as will enable others skilled in the art to which it pertains to make and use the same, reference being had to the accompanying drawings, which form a part of this specification.

This invention relates to collar and cuff buttonhole-stitching machines.

It has for its object a machine adapted and arranged to finish the two buttonholes at the two ends of the collar or the cuff simultaneously and in a modified form, which is shown and described, to finish the middle buttonhole simultaneously with the two end holes of the collar. To accomplish the result, buttonhole-sewing machines equal in number to the buttonholes to be made in a single collar are mounted and arranged upon a support and have applied to them means of adjustment by which those of the machines which finish the end buttonholes are adjustable simultaneously and equally or simultaneously and proportionately to and from the middle line of the support. With this adjustable machine collars of different size may be treated.

In the manufacture of articles of wearing-apparel, and especially in the manufacture of collars, it is necessary to provide for the subsequent shrinking of the material which always takes place with white goods with the first washing after the manufacture, and in such an article as a collar the buttonholes at the ends must be primarily spaced to an extent to allow for the usual shrinkage of the material, so that after the material has been washed and shrunk the buttonholes will then be spaced to suit the wearer. It is customary to allow for this shrinkage one-sixteenth of an inch to the inch of material, so that if it be the purpose of the manufacturer to construct a sixteen-inch collar he must cut his material and primarily space the buttonholes seventeen inches apart. If the final spacing of the shrunken article is less than sixteen inches, the proportion of the finished and shrunken article to the newly-manufactured article will be as sixteen to seventeen. This is the approximate shrinkage and the rule generally adopted by manufacturers, and the application of the rule in using the machine of this invention will be apparent when the gage used in adjusting the sewing-machine is under consideration.

Figure 2:
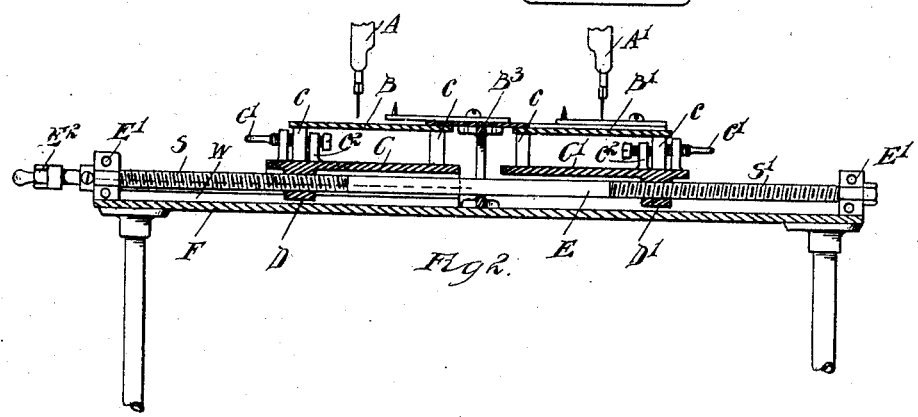
Figure 3:
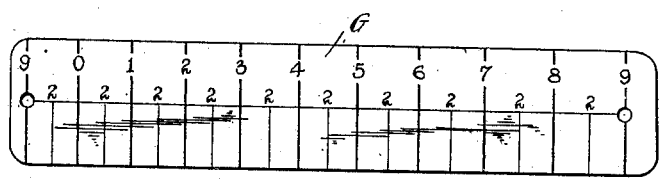
Figure 6:
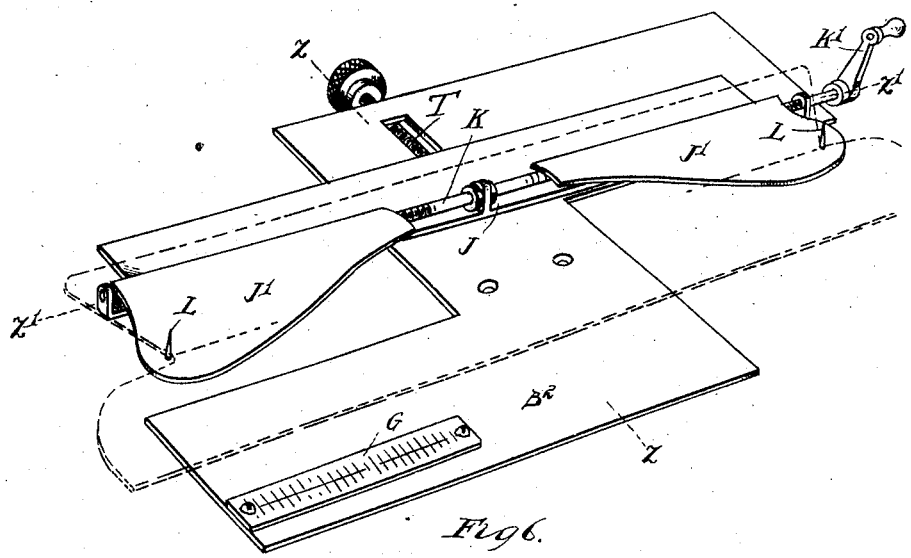
Figure 7:
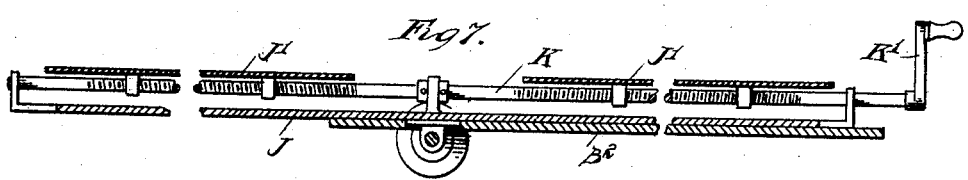
Figure 8:
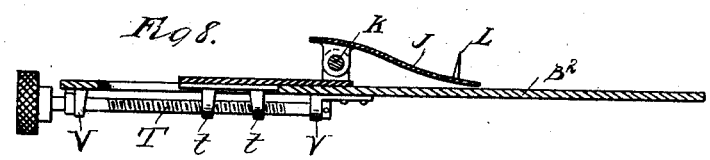
Figure 9:
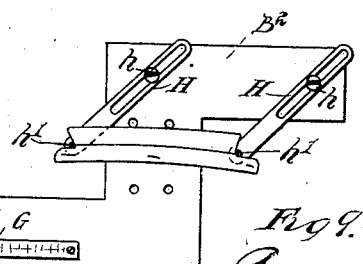

In the drawings, Figure 1 is a diagrammatic plan of the machine. Fig. 2 is a vertical cross-section at the line $xx$ of Fig. 1. Fig. 3 shows the scale employed in adjusting the machine for different sizes of articles. Fig. 4 is a side elevation with parts of the table in section. Fig. 5 is a diagrammatic plan of the machine with three buttonhole-machines adapted to act simultaneously. Fig. 6 is a perspective of a form of work-holder. Fig. 7 is a section on the lines $z'$ $z'$ of Fig. 6. Fig. 8 is a section on the lines $z$ $z$ of Fig. 6. Fig. 9 shows a modified form of work-holder.

The work-holder as shown in Fig. 9 is also shown in use in Figs. 1 and 5.

F indicates a main base or supporting-table provided with tracks or ways W, upon which rest the saddles W' of adjustable platforms C and C'. Upon the platforms rest the sewing-machines. Each sewing-machine base, as base B, rests directly upon bars $c$, which are fixed to the sewing-machine base and which rest loosely upon the platforms C. One of the bars $c$ of the sewing-machine base is interposed between two struts $c^2$, that are fixed to the platform C. An adjusting-screw $c'$ engages each strut and abuts against the bar $c$. The sewing-machine and its base and the bars by which it is sustained may be primarily adjusted slightly across the platform C by means of the said screws $c'$. This primary adjustment is for the purpose of bringing the two sewing-machines into proper relation with respect to the middle line between the platforms C and C'. After the primary adjustment has been effected the subsequent adjustment or varying of the distance between the needles is effected by actuating the platforms C and C'. The actuator for the platform is a screw E, provided at its two ends with screw-threads S and S', one of which is a right-hand thread and the other a left-hand thread.

The threaded part of the screw engages through nuts D and D', which are affixed to and hang from the platforms C and C'. The screw E is journaled at its ends in bearings E'. The bearings retain the screw in position and allow it to rotate on its axis. The rotation of the screw is produced by the winch $E^2$, and the rotation of the screw varies the position of the platforms C and C' and of the sewing-machine supported by them. The sewing-machines are mounted on their platforms to bring the needles to a line which is parallel to the axis of the screw E, and the distance between them is varied along this line parallel to the axis of said screw. If a third sewing-machine is introduced into the combination, as is shown in Fig. 5, the needle of the third sewing-machine is brought into the same line, and the three needles are in a line parallel to the axis of the screw E.

The work is supported on a plate $B^2$, that is supported from the main table F, and this work-support has a main or body part that lies horizontally in a plane with the top surface of the sewing-machine bases and extends to the front and rear of the axis of the screw S. At each end the body part is provided with a wing part that extends parallel with the axis of the screw and lies in front of the bed-plate of a sewing-machine. One of these wings lies in front of the bed-plate of the machine A' and is provided with a graduated scale G, over which travels an index-finger $g$, that terminates in an arm secured to the machine-base of the machine A'. The scale G is provided with graduations determined with reference to the prospective shrinkage of the fabric, and each part of the scale, beginning from the zero-point on the right hand, is greater by one-sixteenth than the corresponding part on a scale of linear inches would be—that is, the distance from zero to "1" is equivalent to one and one-sixteenth; from zero to "2" is equivalent to two and two-sixteenths; from zero to "9" is equivalent to nine-sixteenths of the equivalent measure in linear inches.

The rear wing of the work-support extends in front of the machine A', and to the body of this wing is attached the work-holder.

In the form of holder shown in Figs. 6, 7, and 8 there is secured to the work-support a plate J, provided with two bearing-lugs, through which engages the stem of a rod that is threaded at each side of the middle with right and left hand threads. On each of the screw-threaded parts is run a rest-plate J', held to the screw by threaded lugs. The rest-plates J' are held from rotation and are varied in position equally from the middle of the screw by running the screw through depending threaded lugs on the under side of the rest-plates. Each rest-plate is provided with a pin L, and the work is laid upon the rest-plates with the pins engaging against the work at some predetermined point—as, for example, in stitching the buttonholes of a turn-down collar the rest-plates are adjusted to a width to bring the pins L into engagement with the collar at the turn of the angle between the neck-band and the turn-down part of the collar, the sewing-machines having themselves been previously adjusted to stitch the buttonholes of the collar held in position upon the rest-plates. The rest-plates may be adjusted toward and away from the line of needle action—that is, the line heretofore spoken of as parallel to the axis of the screw S—by a screw T, that engages through lugs $t$ on the under side of the plate J and the ends of which are journaled in lugs V, that hang from the plate $B^2$. A different form of work-holder is shown in Figs. 1, 5, and 9. In this form there are two slotted guide-arms H, held by set-screws $h$ to the plate $B^2$ and provided at their ends with pins $h'$, the relative position of which may be adjusted by sliding and turning the guide-arms H on the screw $h$. The pins $h'$ engage with the collar in a way exactly similar to that already described when explaining the engagement of the pins L with the collar.

If it be desired to employ the third sewing-machine $A^3$, the needle of that machine is set to work at the proper point with reference to the needles of the machines A and A'; but the machine itself is secured by standards $B^3$ to the main table, which either engage directly with the under side of the machine-base or with the under side of the plate $B^2$, to the upper side of which in this case the machine $A^3$ is secured.

All of the sewing-machines are operated by any suitable driving mechanism. No driving mechanism for the sewing-machines is shown, because such mechanism forms no part of this invention, and such mechanism is well known.

What I claim is—

In a collar and cuff buttonhole-stitching machine, the combination of two buttonhole-machines, a main supporting-table therefor, means whereby the distance between the needles of said machine may be varied, a work-supporting plate fixed in position intermediate the needles, an adjustable work-guide held by said work-supporting plate and locating-pins held by said guide, substantially as described.

In testimony whereof I sign this specification in the presence of two witnesses.

GEORGE E. NORRIS.

Witnesses:
R. A. PARKER,
ELLIOTT J. STODDARD.